(12) United States Patent  
Tokuda et al.

(10) Patent No.: US 7,419,183 B2
(45) Date of Patent: Sep. 2, 2008

(54) INFLATOR

(75) Inventors: Masakazu Tokuda, Himeji (JP);
Masayuki Nakayasu, Himeji (JP);
Nobuyuki Katsuda, Himeji (JP)

(73) Assignee: Daicel Chemical Industries, Ltd., Osaka (JP)

( * ) Notice: Subject to any disclaimer, the term of this patent is extended or adjusted under 35 U.S.C. 154(b) by 445 days.

(21) Appl. No.: 11/049,746

(22) Filed: Feb. 4, 2005

(65) Prior Publication Data
US 2005/0189751 A1 Sep. 1, 2005

Related U.S. Application Data

(60) Provisional application No. 60/574,586, filed on May 27, 2004, provisional application No. 60/542,330, filed on Feb. 9, 2004.

(30) Foreign Application Priority Data

Feb. 4, 2004 (JP) ............................. 2004-027556
May 24, 2004 (JP) ............................. 2004-153194

(51) Int. Cl.
*B60R 21/26* (2006.01)
(52) U.S. Cl. ..................................................... 280/737
(58) Field of Classification Search ................. 280/736, 280/737, 740, 741
See application file for complete search history.

(56) References Cited

U.S. PATENT DOCUMENTS

| 5,273,312 | A | 12/1993 | Coultas et al. |
| 5,498,030 | A | 3/1996 | Hill et al. |
| 5,799,969 | A | 9/1998 | Coleman et al. |
| 6,425,601 | B1 | 7/2002 | Lewis |
| 2002/0070535 | A1 | 6/2002 | Dannenhauer et al. |
| 2003/0029349 | A1 | 2/2003 | Katsuda et al. |
| 2006/0097490 | A1* | 5/2006 | Seidl et al. ............. 280/728.2 |
| 2007/0085310 | A1* | 4/2007 | Debler et al. ............. 280/736 |

FOREIGN PATENT DOCUMENTS

| EP | 0790154 A1 | 8/1997 |
| EP | 1122134 A1 | 8/2001 |
| JP | 2528596 B2 | 6/1996 |
| JP | 8-301051 | 11/1996 |
| JP | 10-114286 | 5/1998 |
| JP | 11-34789 | 2/1999 |
| JP | 3133267 B2 | 11/2000 |
| JP | 2003-104164 A | 4/2003 |

* cited by examiner

*Primary Examiner*—Faye M. Fleming
(74) *Attorney, Agent, or Firm*—Birch, Stewart, Kolasch & Birch, LLP

(57) ABSTRACT

Stud bolts 51, 52 are fixed by welding to the side faces of a first closure 30 and a second closure 40, which are connected to a cylindrical housing 20. When connecting a gas introduction port of the air bag to a diffuser portion 43, the stud bolts 51, 52 do not cause an obstruction, and hence the attachability of an inflator 10 to a module case using the stud bolts 51, 52 is not impaired.

22 Claims, 7 Drawing Sheets

INFLATOR

CROSS-REFERENCE TO RELATED APPLICATIONS

This Nonprovisional application claims priority under 35 U.S.C. § 119(e) on U.S. Provisional Application No(s). 60/542,330 filed on Feb. 9, 2004 and 60/574,586 filed on May 27, 2004 and under 35 U.S.C. § 119(a) on Patent Application Nos. 2004-27556 filed in Japan on Feb. 4, 2004 and 2004-153194 filed in Japan on May 24, 2004, the entire contents of which are hereby incorporated by reference.

BACKGROUND OF THE INVENTION

1. Field of the Invention

The present invention relates to an inflator for an air bag system of an automobile.

2. Description of Related Art

An inflator for an air bag system of an automobile is attached to a vehicle body using different attachment methods depending on the type and structure of the inflator. In the case of a front passenger side inflator comprising an elongated housing, the inflator is incorporated in a module case, and hence the inflator is fixed to the module case by a stud bolt provided on an end surface of the housing.

However, some side air bag inflators and curtain air bag inflators for lateral collisions are attached to the air bag by connecting a gas discharge hole of the inflator directly to a gas introduction port of the air bag. In the case of this type of inflator, if the stud bolt is provided on the end surface, the stud bolt interferes with the air bag, and hence connecting the inflator to the air bag becomes difficult. As a method of solving such problems, JP-B No. 2528596 and JP-B No. 3133267 disclose inflators comprising a stud bolt provided on the side surface of the housing.

The inflators disclosed in JP-B No. 2528596 and JP-B No. 3133267 are both provided with a separate outside housing surrounding the housing, to which stud bolts are attached. As a result, the overall size of the inflator increases, and hence these inflators are not suitable as a side air bag inflator or curtain air bag inflator having a particularly restricted attachment space.

SUMMARY OF THE INVENTION

The present invention provides an inflator having reduced size and weight, and by which the inflator, such as a side air bag inflator or curtain air bag inflator, may be installed in a restricted attachment space.

The present invention also provides an inflator, in which freedom (and adaptability) of attachment to a module case or vehicle is improved.

The inflator may be a side air bag inflator, having reduced attachment space, but the inflator is not limited thereto, and may also be applied to various other inflators, such as a driver side inflator, a front passenger side inflator, and a knee bolster inflator.

The present invention provides an inflator comprising a cylindrical housing, both ends of which are open, a first closure attached to an opening portion on one end of the cylindrical housing, and a second closure attached to an opening portion on the other end of the cylindrical housing, wherein a pressurized gas is charged into a sealed space surrounded by the cylindrical housing, the first closure, and the second closure, ignition means is accommodated inside the first closure, and a gas discharge hole is provided in the second closure, and a stud bolt is fixed directly to at least one, preferably one or two, of a side face of the first closure and a side face of the second closure by welding.

By fixing a stud bolt directly to one or both of the side face of the first closure and the side face of the second closure by welding in this manner, the size and weight of the inflator can be reduced below those of the inflators disclosed in JP-B No. 2528596 and JP-B No. 3133267. There are no particular limitations on the method of fixing and welding the stud bolt, but resistance welding is preferably applied.

Further, by welding the stud bolts to the side face of the first closure and the side face of the second closure, the penetration depth of the welding portion can be increased, thereby increasing the fixing strength.

Note that the cylindrical housing, first closure, and the second closure are also fixed together by welding. This welding may be performed before or after the stud bolts are fixed to the first closure and second closure.

In the inflator described above, both the side face of the first closure and the side face of the second closure, which contact the stud bolts during the welding, are preferably flat surfaces.

By forming a flat surface portion on part of the side faces of the first closure and second closure, and attaching the end face of the stud bolts to the flat surface portions in a protruding form, heat is more likely to accumulate during the resistance welding, thereby preferably increasing the welding strength. The protruding portion on the end face of the stud bolt may be constituted in a hemispherical form, a pointed form, or an annular form, and a plurality of protruding portions may be formed.

In the inflator described above, the end face of the stud bolts and the side faces of the first closure and second closure, which contact each other during the welding, are preferably formed such that the end face of the stud bolt takes a protruding form or a recessed form, and the side faces of the first closure and second closure take a recessed form or a protruding form, which matches the protruding form or recessed form of the end face of the stud bolt.

By correlating the form of the side faces of the first closure and second closure with the form of the end face of the stud bolts in this manner, positioning is easy when welding is to be performed. Note that further providing a small protrusion on the tip of the protruding portion is useful for resistance welding.

As a result, positioning of the welding locations is easy, the welding (preferably resistance welding) itself is easy, and since no gaps appear, the welding strength can be increased.

Instead of correlating the protruding portion and recessed portion as described above, at least one, preferably one or two, protruding portion may be provided on the end face of the stud bolt, and a flat surface portion may be formed on part of the side faces of the first closure and second closure so that welding (preferably resistance welding) is performed between the protruding portion and flat surface portion. Conversely, the end face of the stud bolt may be formed as a flat surface, and at least one protruding portion may be provided on part of the side faces of the first closure and the second closure so that welding (preferably resistance welding) is performed between the flat surface and the protruding portion.

As another means for achieving the aforementioned objects, the present invention provides an inflator comprising a cylindrical housing having a sealed space into which a pressurized gas is charged and a gas outlet on one end face thereof for releasing the pressurized gas, and ignition means for opening the sealed space in the cylindrical housing and discharging the pressurized gas through the gas outlet, wherein a stud bolt is fixed by welding directly to at least one location on part of a side face of the cylindrical housing having a constant thickness.

By fixing a stud bolt directly to the side face of the cylindrical housing by welding in this manner, the size and weight of the inflator can be reduced below those of the inflators disclosed in JP-B No. 2528596 and JP-B No. 3133267. Resistance welding is preferably employed as the method of welding the stud bolts.

Further, when two stud bolts are fixed by welding to the part of the side face of the cylindrical housing having a constant thickness, the welding strength of the two stud bolts can be made identical if welding is performed under identical conditions. In so doing, the welding strength of one of the stud bolts does not decrease.

In the inflator described above, the side face of the cylindrical housing, which contacts the stud bolt during the welding, is preferably a flat surface.

By forming a flat surface portion on part of the side face of the cylindrical housing, and forming the end face of the stud bolt to be attached to the flat surface portion in a protruding form, heat is more likely to accumulate during the resistance welding, which is preferable. The protruding portion on the end face of the stud bolt may be constituted in a hemispherical form, a pointed form, or an annular form, and a plurality of the protruding portions may be formed.

In the inflator described above, the side face of the cylindrical housing, which contacts the stud bolt during the welding, is preferably a curved surface, and the end face of the stud bolt is preferably provided with a protruding portion.

Resistance welding can also be applied when the stud bolt is welded to a curved surface as described above. In this case, if at least one protruding portion is formed on the end face of the stud bolt, the protruding portion melts during the resistance welding, the melt moves into the gap between the curved surface and the stud bolt, and thus the curved surface of the cylindrical housing and the stud bolt are fused. Hence the amount by which the protruding portion protrudes is determined in consideration of the magnitude of the gap. When two or more protruding portions are provided, the lengths thereof are adjusted to fit the curvature of the side face of the cylindrical housing.

In the inflator of the present invention, a bracket is preferably attached to the stud bolt. This bracket can function as a component for attaching the inflator to an attachment object such as an air bag module case or a vehicle body.

When attaching the inflator to an attachment object such as an air bag module case or a vehicle body, the form and size of the bracket differs according to the form of the inflator, the form and attachment position of the attachment object, and so on. In the present invention, however, brackets having different forms and sizes may be used depending on the form and attachment position of the inflator, the attachment object, and so on. Hence the present invention is compatible with many types of inflators and numerous attachment objects and attachment positions.

As a method of attaching the bracket to the inflator, engagement of the bracket to the stud bolts or the like may be employed. Particularly when stud bolts are provided on the side face of the inflator (the side face of the housing or the side faces of the first closure and second closure, for example), a method of forming a hole in the bracket through which the stud bolt passes, screwing a nut onto the stud bolt after passing the stud bolt through the bracket, and tightening the bracket with the nut is preferably employed. As a method of attaching the bracket to an air bag module case, vehicle body, or the like, a method of passing a bolt provided on the attachment object through a hole provided in the bracket, screwing a nut onto the bolt, and tightening the bracket with the nut may be employed. Alternatively, a method of fixing the bracket to the attachment object in advance by direct welding, bolting, and so on, and then bolting the stud bolt to a hole formed in the bracket using a nut may be employed.

Further, in the inflator of the present invention, a plurality of stud bolts may be provided on the side face of the inflator. The plurality of stud bolts may be arranged along the axial direction of the cylindrical housing, or arranged along the circumferential direction of the cylindrical housing. Particularly when forming the plurality of stud bolts along the circumferential direction of the housing, the stud bolts are preferably formed in series in the circumferential direction. Note, however, that in this case, the stud bolts do not strictly have to be arranged on the same circumference, and the fixing strength can still be ensured as long as any deviation remains within the width of the bracket. Thus the plurality of stud bolts may deviate slightly from the circumferential direction of the housing.

Further, when the plurality of stud bolts are provided, further stud bolts may be provided in the circumferential direction of the housing to correspond to all of the stud bolts arranged in the axial direction of the housing, or further stud bolts may be provided in the circumferential direction of the housing to correspond to "part" of the stud bolts arranged in the axial direction of the housing. In other words, a form may be provided in which one of the stud bolts in the axial direction is accompanied by another stud bolt provided in the circumferential direction, but the other stud bolt in the axial direction is not accompanied by another stud bolt lined up in the circumferential direction (i.e., remains as a single stud bolt).

Particularly when the plurality of stud bolts is arranged along the circumferential direction of the cylindrical housing, the bracket is preferably an integral bracket attached to all, or at least two, of the plurality of stud bolts provided along the circumferential direction. Since the integral bracket fixes the plurality of stud bolts arranged along the circumferential direction of the cylindrical housing all together, holes through which the plurality of stud bolts pass are formed in the parts of the bracket for fixing the inflator in an equal number to the number of stud bolts fixed to the integral bracket.

For example, two stud bolts are aligned along the circumferential direction of the side face of the inflator. By forming the stud bolts in this manner, the stud bolts can be supported with greater strength than when supported at a single point, even if a rotation moment occurs in the circumferential direction of the inflator about the housing axis. Alternatively, when one or more stud bolts arranged in the circumferential direction are lined up in a plurality (of groups) in the axial direction, a single bracket may be attached to all of these stud bolts. In other words, a single (or connected) bracket may be attached to the stud bolts lined in the axial direction.

The inflator of the present invention is particularly suitable as a curtain air bag inflator or side air bag inflator. The inflator of the present invention may also be applied to a driver side inflator, a front passenger side inflator, or a knee bolster inflator.

The inflator of the present invention does not use a separate member such as the outside housing as disclosed in JP-B No. 2528596 and JP-B No. 3133267 when the stud bolts are fixed, and therefore may respond adequately to demands for reduced size and weight. Moreover, the number of manufacturing steps is reduced, thereby improving productivity.

The inflator of the present invention excels particularly in facilitating the attachment work of an inflator having restricted attachment space, such as in a case of a side air bag inflator or curtain air bag inflator.

The inflator of the present invention is capable of improving the freedom (and adaptability) of attachment to a module case or vehicle when the inflator is attached to a module case or a vehicle.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION (1) First Embodiment

Figure 1:
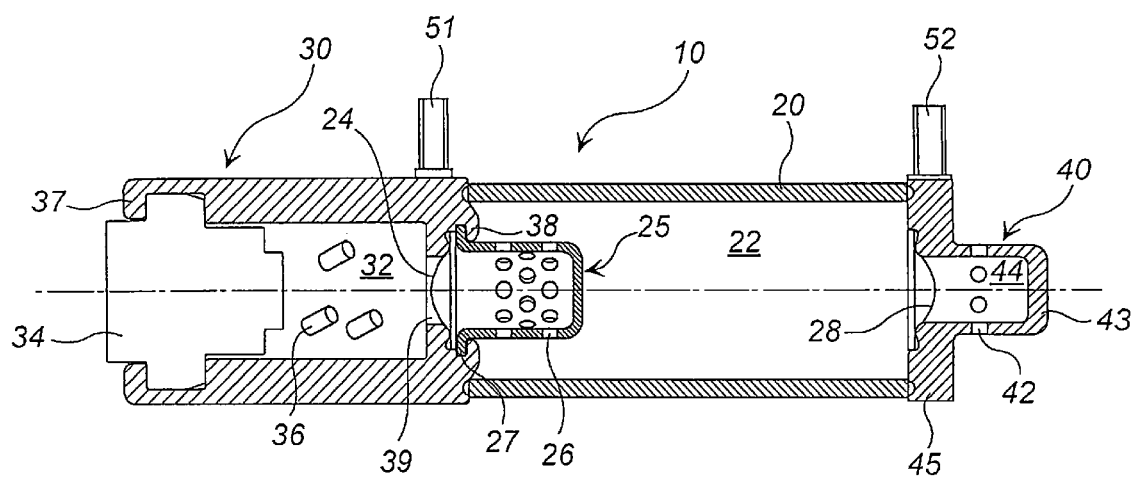
FIG. 1 is a sectional view in an axial direction of an inflator according to an embodiment of the present invention.
Figure 2:
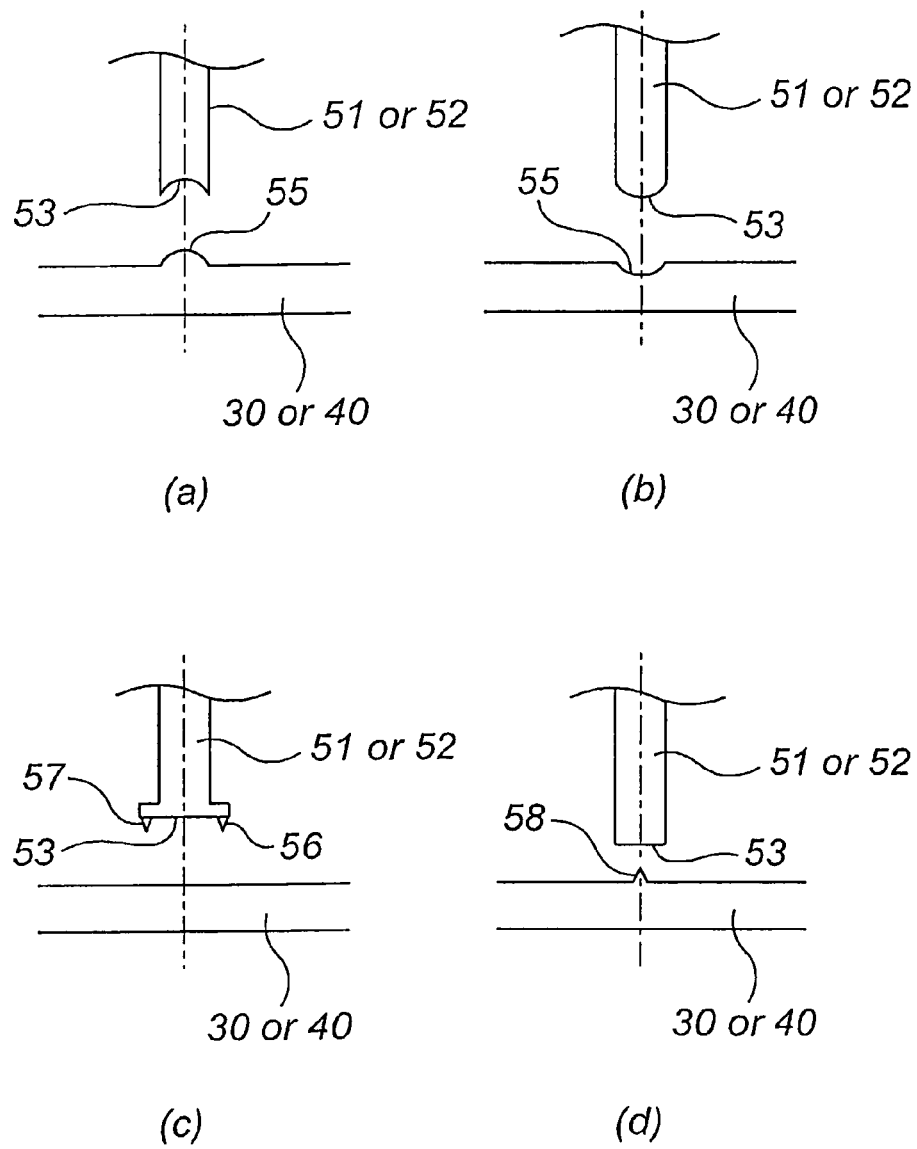
FIG. 2(a), FIG. 2(b), FIG. 2(c) and FIG. 2(d) are illustrative views of a stud bolt attachment method.

FIG. 1 is a sectional view in an axial direction of an inflator, and FIGS. 2(a) through 2(d) are illustrative views of a stud bolt attachment method.

An inflator 10 comprises a cylindrical housing 20, both ends of which are open, a first closure 30 attached to an opening portion on one end of the cylindrical housing 20, and a second closure 40 attached to an opening portion on the other end of the cylindrical housing 20.

A pressurized gas such as argon, helium, or nitrogen, serving as an air bag inflation medium, is charged into a sealed space (i.e., a pressurized gas chamber) 22 surrounded by the cylindrical housing 20, first closure 30, and a second closure 40. The charging pressure is set at a maximum pressure of approximately 70,000 kPa.

The cylindrical housing 20 is made of steel or the like having a peripheral wall of a constant thickness. The cross-section of the housing is not limited to a circular form, and may be polygonal or elliptical.

The interior of the first closure 30 defines an ignition means chamber 32 accommodating an electric igniter 34 and a required amount of a gas generating agent 36. The igniter 34 is fixed to the first closure 30 by crimping an edge 37 of an opening end of the first closure 30. The ignition means chamber 32 is under normal (atmospheric) pressure.

The first closure 30 (i.e., the ignition means chamber 32) and the pressurized gas chamber 22 are connected by a communication path 39, which is closed by a first rupturable plate 24. The first rupturable plate 24 is attached to an end wall of the first closure 30 by welding.

The second closure 40 is provided with a plurality of gas discharge holes 42. A gas introduction port of the air bag is connected to a diffuser portion 43 in which the gas discharge holes 42 are provided. An interior space 44 of the second closure 40 is under a normal (atmospheric) pressure.

The interior space 44 defined by the second closure 40 and the pressurized gas chamber 22 are closed from each other by a second rupturable plate 28. The second rupturable plate 28 is attached to a flange portion 45 of the second closure 40 by welding.

A stud bolt 51 is fixed to a side face of the first closure 30 by resistance welding, and a stud bolt 52 is fixed to a side face (e.g., the flange portion 45) of the second closure 40 by resistance welding. The thickness of the respective welding locations is considerably greater than the thickness of the peripheral wall of the cylindrical housing 20. The stud bolts 51, 52 are positioned co-linearly with respect to an axial direction of the inflator 10, and extend in a direction perpendicular to the axial direction of the inflator 10.

The side faces of the first closure 30 and second closure 40, which contact the stud bolts 51, 52, respectively, during welding, are both flat. Note, however, that the side faces of the first closure 30 and second closure 40 may be curved, and the stud bolts 51, 52 may be welded to the curved surface portions thereof.

As shown in FIG. 2(a), a side face 55 of the first closure 30 (or the second closure 40), which contacts the stud bolt 51 (or 52) during welding, may be provided with a protrusion (a convex portion), and an end face 53 of the corresponding stud bolt 51 (or 52) may be provided with a recessed portion (a concave portion), such that the resistance welding is performed between the protrusion and the recessed portion.

Conversely, as shown in FIG. 2(b), the side face 55 of the first closure 30 (or the second closure 40), which contacts the stud bolt 51 (or 52) during welding, may be provided in a recessed portion (a concave portion), and the end face 53 of the corresponding stud bolt 51 (or 52) may be provided with a protrusion (a convex portion). In this case, a further protrusion is preferably provided on either the convex portion or the concave portion, such that heat can be generated on the protruding part more easily during the resistance welding.

As shown in FIG. 2(c), a plurality of protruding portions 56, 57 may be provided on the end face 53' of the stud bolt 51 (or 52), and a side face 55' of the corresponding first closure 30 (or the second closure 40) may be provided as a flat surface portion, such that the resistance welding is performed between the protruding portions 57 and the flat surface portion. The protruding portions 57 may be a plurality of independent protruding portions or an annular protruding portion.

Note that the side face of the first closure 30 (or the second closure 40) may be a curved surface, and the plurality of protruding portions 57, 56 may be formed on the end face 53' of the stud bolt 51 (or 52) in a form which matches the form of the curved surface.

As shown in FIG. 2(d), the end face 53" of the stud bolt 51 (or 52) may be formed as a flat surface, and the side face 55, of the corresponding first closure 30 (or the second closure 40) may be provided with a protruding portion 58, such that the resistance welding is performed between the end face 53" and the protruding portion 58. The protruding portion 58 may be a plurality of independent protruding portions, or an annular protruding portion.

By correlating the form of the end face 53 of the stud bolt 51 (or 52) and the form of the side face 55 (55', 55") of the corresponding first closure 30 (or the second closure 40) as shown in FIGS. 2(a) to 2(d), positioning of the welding locations can be determined easily, welding itself can be performed easily, and the welding strength can be increased.

Upon performing resistance welding, a method of pressing together the end face 53 of the stud bolt 51 (or 52) and the side face 55 (55', 55") of the corresponding first closure 30 (or the second closure 40), and causing a large current to flow between the two may be employed. The two components may also be fixed using arc spot welding. Welding may be performed using similar methods in the other embodiments described below.

Next, an operation of the inflator 10 shown in FIG. 1, when applied as a curtain air bag inflator or a side air bag inflator, and incorporated in an air bag system installed in an automobile will be described.

Note that the inflator 10 is attached inside a prescribed module case or to the vehicle body by a combination of the stud bolts 51, 52 and nuts, and that the gas introduction port of the air bag is connected to the diffuser portion 43. At this time, the stud bolts 51, 52 are fixed to the side face of the inflator 10, and therefore do not interfere with the air bag connected to the inflator 10 in the axial direction thereof. As a result, connection of the diffuser portion 43 and the gas introduction port of the air bag can be performed easily, and a favorable attachability of the inflator 10 to the module case by the stud bolts 51, 52 can be obtained.

When the vehicle crashes and receives a shock, operation signal outputting means (not shown) causes the igniter 34 to activate, whereby the gas generating agent 36 is ignited and burned to generate high temperature combustion gas. The high temperature combustion gas causes the internal pressure of the ignition means chamber 32 to rise, and as a result, the first rupturable plate 24 ruptures, releasing the combustion gas into the pressurized gas chamber 22. The combustion gas which has entered the pressurized gas chamber 22 causes the internal pressure of the pressurized gas chamber 22 to rise. As a result of the increase in pressure in the pressurized gas chamber 22, the second rupturable plate 28 ruptures, whereby the pressurized gas and combustion gas pass through the internal space 44 and are discharged from the gas discharge holes 42. Thus the air bag is inflated.

The air bag is inflated in the axial direction of the inflator 10, but since the stud bolts 51, 52 are fixed to the side face of the inflator 10 (e.g., in an orthogonal direction to the axial direction), they do not obstruct the inflation of the air bag in the axial direction.

(2) Second Embodiment

Figure 3:
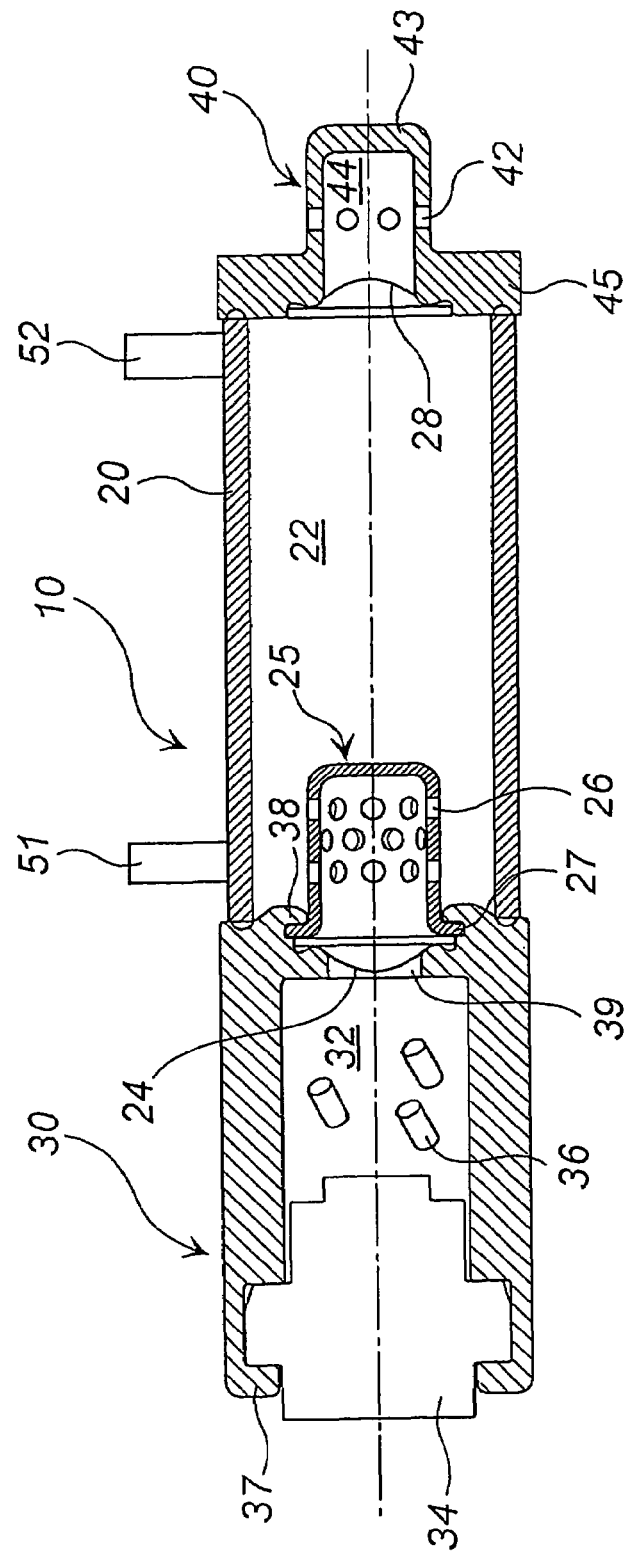
FIG. 3 is a sectional view in an axial direction of an inflator according to another embodiment of the present invention.

FIG. 3 is a sectional view in the axial direction an inflator. The inflator shown in FIG. 3 differs from the inflator 10 shown in FIG. 1 only in the fixing positions of the stud bolts 51', 52'.

The stud bolts 51', 52' are fixed to the peripheral wall (having a constant thickness) of the cylindrical housing 20 by resistance welding. The stud bolts 51', 52' are positioned co-linearly along the axial direction of the inflator 10, and extend in a direction perpendicular to the axial direction.

The stud bolts 51', 52' and the peripheral wall of the cylindrical housing 20, which contact each other during welding, preferably have a similar relationship to one of those shown in FIGS. 2(a) to 2(d) from the point of view of increasing the welding strength. Otherwise, these components may take a similar form to that described in the first embodiment.

The peripheral wall of the cylindrical housing 20 has a constant thickness, and therefore when the two stud bolts are welded, the welding strength of the two stud bolts can be made equal by welding under identical conditions. In so doing, a favorable workability can be obtained, and a situation in which the welding strength of one of the stud bolts being weaker than that of the other stud bolt can be prevented.

(3) Third Embodiment

Figure 4:
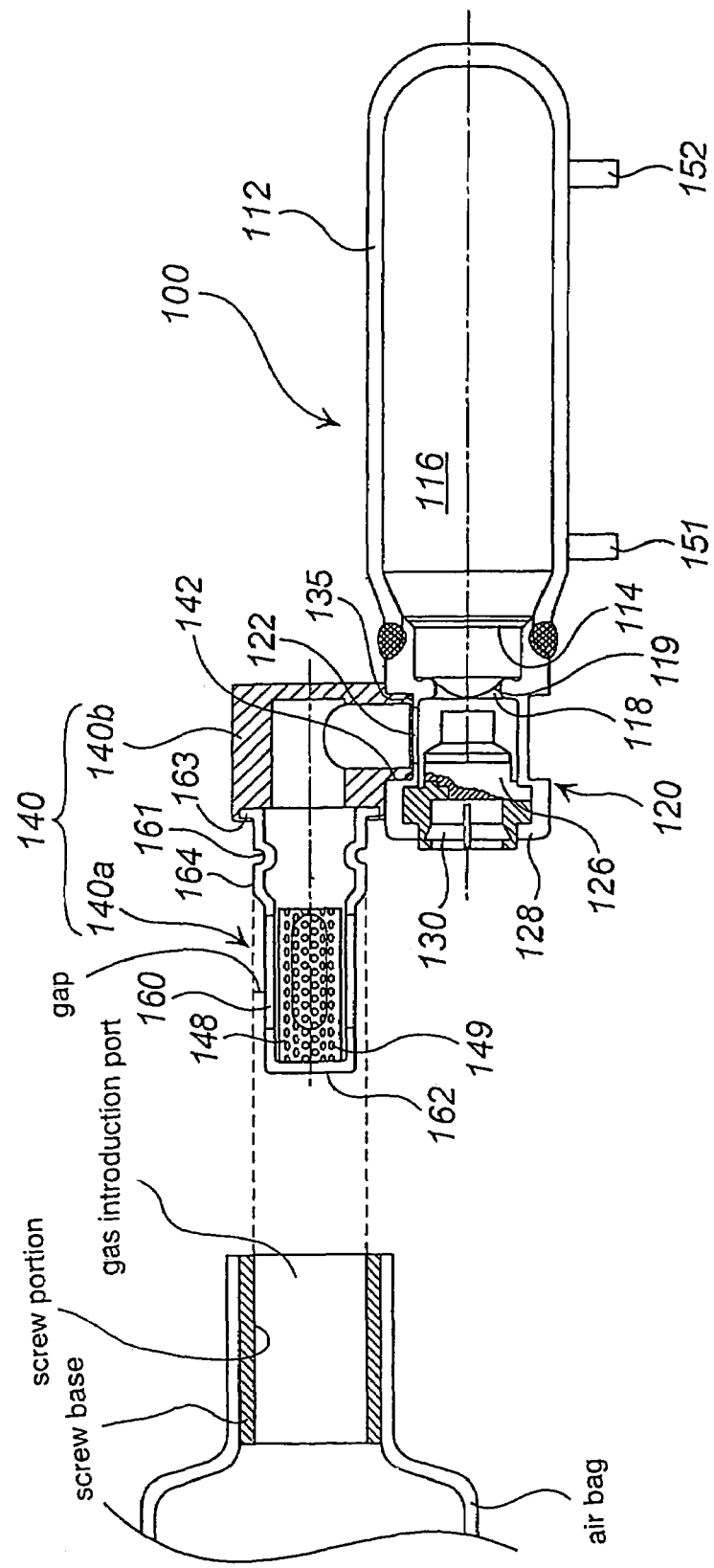
FIG. 4 is a sectional view in an axial direction of an inflator according to yet another embodiment of present invention.

FIG. 4 is a sectional view in an axial direction of an inflator (inflator 100), and also serves as an illustrative view of an air bag attachment method.

A cylindrical housing 112 has an opening portion 114 at one end side thereof, whereas the other end side thereof is closed. An inert gas, such as argon or helium, a nitrogen gas, or similar is charged into a sealed space (i.e., a pressurized gas chamber) 116 at a maximum pressure of approximately 70,000 kPa. The cylindrical housing 112 has a circular cross section with respect to the axial direction, and the opening portion 114 has a similar circular cross section.

Stud bolts 151, 152 are fixed to the peripheral wall (having a constant thickness) of the cylindrical housing 112 by resistance welding. The stud bolts 151, 152 are positioned co-linearly in the axial direction of the inflator 100, and extend in a perpendicular direction to the axial direction.

In order to increase the welding strength, the stud bolts 151, 152 and the peripheral wall of the cylindrical housing 112, which contact each other during the welding, preferably have a similar relationship to those shown in FIGS. 2(a) to 2(d), and particularly to that shown in FIG. 2(c). Otherwise, these components may take a similar form to that described in the first embodiment.

A diffuser portion 120 is connected to the opening portion 114 side of the cylindrical housing 112. The diffuser portion 120 has a first gas discharge hole 122 serving as a gas outlet through which the pressurized gas is released to the outside. The cylindrical housing 112 and diffuser portion 120 may be connected by welding or by being screwed together.

A pressurized gas outflow path 118 (serving as a gas outlet) between the opening portion 114 (serving as a gas outlet) of the cylindrical housing 112 and the diffuser portion 120 is closed by a rupturable plate 119, and a sealed space 116 defined by the cylindrical housing 112 is maintained under a high-pressure and in an airtight state prior to an activation. In FIG. 4, the rupturable plate 119 is attached to the diffuser portion 120, but may be attached to the opening portion 114 of the cylindrical housing 112. The first gas discharge hole 122 of the diffuser portion 120, on the other hand, is not closed.

An igniter 126 comprising a priming or ignition agent is provided in the diffuser portion 120 as rupturing means for rupturing the rupturable plate 119 (opening means for opening the sealed space 116). The igniter 126 is attached after connecting the cylindrical housing 112 to the diffuser portion 120 by being inserted toward the rupturable plate from an opening portion on one end of the diffuser portion 120. Following its insertion, the igniter 126 is fixed by crimping a peripheral edge 128 of the opening portion on the one end of the diffuser portion 120. 130 denotes a connector insertion space.

A gas discharge port 140 communicates the diffuser portion 120. These two components are connected by pressing and inserting a pressurized gas inflow portion 142 of the gas discharge port 140 into the first gas discharge hole 122 of the diffuser portion 120. The diameter of the inflow portion 142 of the gas discharge port 140 is slightly smaller than the diameter of the first gas discharge hole 122 of the diffuser portion 120.

One end of the gas discharge port 140 is closed (closed end face 162), and the other end is open. The gas discharge port 140 comprises a main body portion 140a including a flange portion 163, and an adapter portion 140b. These components are connected by meshing or fitting the flange portion 163 of the main body portion 140a into the interior of the adapter portion 140b, and then crimping an end portion of the adapter portion 140b, but may also be connected by resistance welding. Note that the main body portion 140a and adapter portion 140b of the gas discharge port 140 may also be formed integrally.

The adapter portion 140b and the diffuser portion 120 are connected by resistance welding at a welding portion 135. Here, the inflow portion 142 of the adapter portion 140b and the diffuser portion 120 may be resistance welded, and then the main body portion 140a connected thereto, or the adapter portion 140b and diffuser portion 120 may be resistance welded after connecting the main body portion 140a to the adapter portion 140b.

A plurality of opening portions (i.e., second gas discharge holes) 160 is provided in the side face of the main body portion 140a, and a screen 148 comprising a plurality of outflow holes 149 for removing foreign objects from the pressurized gas which passes therethrough is disposed in the interior of the main body portion 140a. The diameter of the outflow holes 149 may be selected from the numerical value range of between 0.5 and 2.0 mm.

At least two of the plurality of opening portions 160 are disposed in symmetrical or almost symmetrical positions. Six opening portions 160, for example, may be provided at equal intervals in the circumferential direction.

The screen 148 may be constituted by one or a plurality of laminated layers of punching metal, plain weave wire gauze, or a similar material, formed into a cylindrical form and disposed such that the axial direction of the screen 148 and the axial direction of the gas discharge port 140 (main body portion 140a) are in alignment. The outflow holes 149 are provided over the entire surface of the screen 148, but substantially only those that face the opening portions 160 discharge the pressurized gas and thus exhibit a foreign object removal action.

A protruding portion 164 and a groove portion (i.e., a recessed portion) 161 are provided consecutively or at an interval (preferably consecutively) in the circumferential direction on the side of the main body portion 140a near the adapter portion 140b.

The protruding portion 164 has a flat top surface which may be provided with a screw portion (e.g., a male screw portion or a female screw portion), if necessary, and is provided in the vicinity of the opening portions 160. The protruding portion 164 is used when connecting the inflator 100 to an air bag 170 at the gas discharge port 140 by engaging the screw portion with a screw portion 174 formed in a screw base 176 of an air bag 170. When the air bag 170 is attached to the main body portion 140a, a gap 178 is formed between the screw base 176 and an outer peripheral surface of the main body portion 140a. The height in the radial direction and the length in the axial direction of the protruding portion 164 may be determined in consideration of the connectability (connecting strength, workability, etc.) with the air bag 170.

The groove portion 161 is used when assembling the air bag device to tighten the gas introduction port 172 of the air bag 170 onto the main body portion 140a after placing the gas introduction port 172 onto the main body portion 140a. As a result, the two components can be joined securely, preventing the air bag from falling. The depth of the groove portion 161 in the radial direction may be determined in consideration of the connectability (e.g., connecting strength, workability, etc.) with the air bag 170.

In the inflator 100, the stud bolts 151, 152 are fixed to the side face of the inflator 100, and therefore do not obstruct the air bag, which is connected in the axial direction of the inflator 100. As a result, the connection of the gas discharge port 140 and the gas introduction port 172 of the air bag 170 can be performed easily, and the attaching of the inflator 100 to the module case of the inflator 100 also becomes favorable. Moreover, since the air bag inflates in the axial direction of the inflator 100, the stud bolts 151, 152 do not obstruct the inflation of the air bag.

As well as the inflator 100 shown in FIG. 4, at least one bole may also be welded to the peripheral wall of an inflator illustrated in FIGS. 1 to 6 of JP-A 2003-104164 in a similar manner to this embodiment, whereby similar actions and effects are obtained.

(4) Fourth Embodiment

Figure 5:
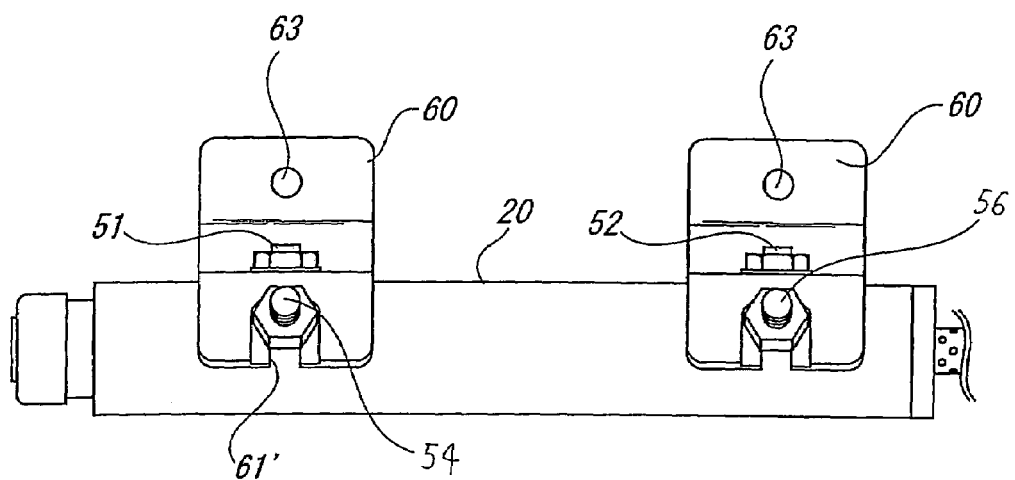
FIG. 5 is a side view of yet another embodiment of the inflator of the present invention.
Figure 6:
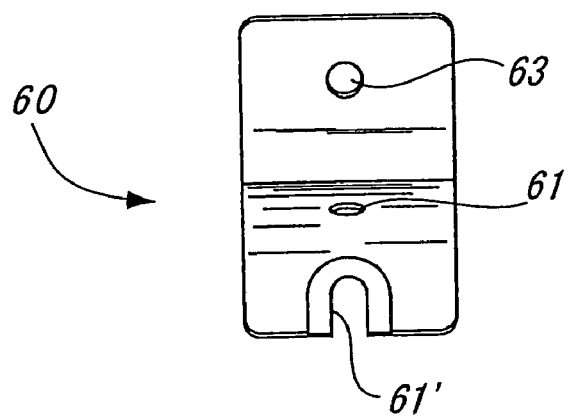
FIG. 6 is an enlarged view showing a bracket used in the inflator shown in FIG. 5.
Figure 7A:
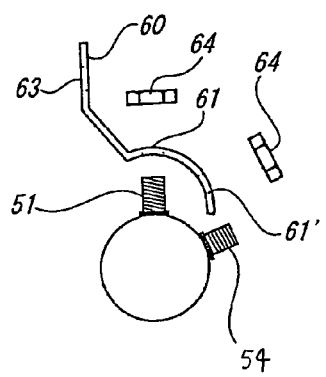
FIG. 7(a), FIG. 7(b) and FIG. 7(c) are schematic views showing a fixing process for fixing the bracket to the stud bolt.
Figure 7B:
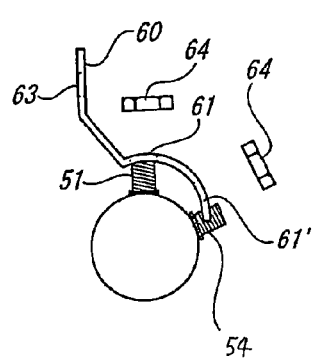
Figure 7C:
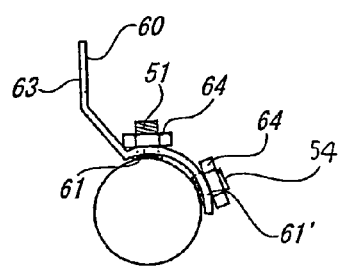

FIG. 5 is a side view of an inflator provided with a bracket, FIG. 6 is an enlarged view of the bracket, and FIGS. 7(a) to 7(c) are schematic views showing a fixing process for fixing the bracket to stud bolts. Note that in FIGS. 5 to 7, identical reference numerals are allocated to identical members and constitutions to those of the inflator shown in FIG. 1 or FIG. 2, and description thereof will be omitted.

In FIG. 5, the two stud bolts 51, 52 are formed in series in the axial direction on the side face (i.e., the peripheral surface) of the inflator housing 20, and two more stud bolts 54, 56 are provided in series in the circumferential direction of the housing in relation to the two stud bolts 51, 52. In other words, in the inflator of this embodiment, two stud bolts ((51, 54) or (52, 56)) lined up in the circumferential direction on the side face of the housing are provided in two locations along the axial direction of the housing. This type of inflator may be implemented in the inflators shown in FIGS. 1, 3, and 4 by providing two stud bolts in the circumferential direction of the inflator in addition to the two stud bolts shown in the drawings. Note that either the stud bolt 51' or the stud bolt 52' may be omitted.

In the inflator shown in FIG. 5, the stud bolt 51 (or 52) and the stud bolt 54 (or 56), provided on the side face of the housing 20 in series in the circumferential direction, are preferably provided at an attachment angle of not more than 90°, or more preferably not more than 60°, and more preferably not more than 45°. A single bracket 60 (i.e., an integral bracket) is fixed by the stud bolts 51 and 54 (or 52 and 56) lined up in the circumferential direction of the housing 20. Accordingly, two engaging portions for engaging with the two stud bolts 51 and 54 (or 52 and 56) lined up in the circumferential direction of the housing 20 are formed in the bracket 60. The engaging portions may be realized by one or a combination of a hole 61 (not shown in FIG. 5 but shown in FIG. 6) through which the stud bolt passes, a U-shape notch into which the stud bolt fits loosely, or a notch 61' with a similar form. When one of the engaging portions is formed as the U-shaped notch 61', the notch is formed to open onto the end portion of the bracket 60 (the end portion on the side for fixing the housing).

As shown in FIG. 6, the bracket 60 used in this embodiment has a single hole 61 and a single U-shaped notch 61'. The stud bolt 51 is fixed to the hole 61, and the stud bolt 51' is fixed to the U-shaped notch 61' (see FIG. 5). The bracket 60 is provided with a portion formed into a curve which contacts the inflator housing 20, a portion which extends from the portion formed into a curve, and where necessary, a meandering portion. The bracket 60 further comprises a fixing portion 63 at one end, to which an attachment object such as the air bag module case or the vehicle body is fixed. When the bracket is fixed to the attachment object by a nut 64 as shown in FIG. 7 or the like, this fixing portion may be formed as a hole, as illustrated in this embodiment. The fixing portion may also be formed as the aforementioned U-shaped notch in such a case. When the bracket is fixed to the attachment object by welding or the like, the fixing portion may be formed as a welding seam.

Note that when the engaging portion or fixing portion is formed as a hole, the hole is preferably formed as an elongated hole so that a bolt can be fitted loosely therein.

Next, a joining process of this embodiment for joining the stud bolts to the bracket will be described on the basis of FIG. 7. First, the bracket 60 is brought close to the stud bolt 51 parallel to the axial direction of the stud bolt 51 (FIG. 7(*a*)), and before passing the tip of the stud bolt 51 through the hole 61, the stud bolt 54 is passed through the U-shaped notch 61' (FIG. 7(*b*)). The length and formation position of the stud bolts 51, 54 and the form and formation position of the hole 61 and U-shaped notch 61' are preferably adjusted so that this relationship is satisfied. The bracket 60 is then brought closer to the housing 20, and when the stud bolt 51 has passed through the hole 61 completely (FIG. 7(*c*)), the nut 64 is attached to each of the stud bolts 51, 54 to fix the bracket to the housing 20. Another bracket 60 may be fixed to the stud bolts 52, 56 in a similar manner.

As a result, an inflator having brackets attached to the stud bolts can be formed. Note that in FIG. 5, two brackets 60 may be formed integrally, for example, by connecting the two brackets 60 to each other.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. An inflator, comprising:
   a cylindrical housing having a first open end and a second open end;
   a first closure attached to the first open end to close the first open end;
   a second closure attached to the second open end to close the second open end, the second closure including a gas discharge hole and a flange portion extending outwardly;
   ignition means accommodated inside the first closure; and
   a first stud bolt welded directly to a side face of the flange portion.

2. The inflator according to claim 1, the side face of the flange portion, which makes contact with the first stud bolt during the welding, is substantially flat.

3. The inflator according to claim 1, wherein an end face of the first stud bolt that faces the flange portion is concaved, and the side face that makes contact with the first stud bolt is convexed, such that a concaved portion of the first stud bolt matches a convexed portion of the side surface.

4. The inflator according to claim 1, wherein an end face of the first stud bolt that faces the flange portion is convexed, and the side face that makes contact with the first stud bolt is concaved, such that a convexed portion of the first stud bolt matches a concaved portion of the side surface.

5. The inflator according to claim 1, further comprising:
   a pressurized gas charged into a sealed space surrounded by the cylindrical housing, the first closure, and the second closure.

6. An inflator, comprising:
   a cylindrical housing including a peripheral side wall with at least two portions having substantially the same thickness, the cylindrical housing defining a sealed space into which a pressurized gas is charged, and a gas outlet on one end face thereof for releasing the pressurized gas;
   ignition means for opening the sealed space in the cylindrical housing and discharging the pressurized gas through the gas outlet; and
   at least two stud bolts welded, from an outside of the cylindrical housing, directly to the at least two portions where the pressurized gas is charged.

7. The inflator according to claim 6, wherein the two portions of the cylindrical housing, which contact the at least two stud bolts during the welding, are substantially flat.

8. An inflator, comprising:
   a cylindrical housing including a peripheral side wall with at least two portions having substantially the same thickness, the cylindrical housing defining a sealed space into which a pressurized gas is charged, and a gas outlet on one end face thereof for releasing the pressurized gas;
   ignition means for opening the sealed space in the cylindrical housing and discharging the pressurized gas through the gas outlet; and
   at least two stud bolts welded, from an outside of the cylindrical housing, directly to the at least two portions where the pressurized gas is charged,
   wherein the two portions of the cylindrical housing, which contacts the at least two stud bolts during the welding, are curved, and an end face of each of the at least two stud bolts is provided with a protruding portion.

9. The inflator according to claim 6, further comprising:
   a bracket adapted to be attached to the at least two stud bolts.

10. The inflator according to claim 9, wherein the at least two stud bolts are welded to the two portions located along the circumferential direction of the cylindrical housing substantially perpendicular to an axial direction of the cylindrical housing, and the bracket is adapted to be integrally attached to the at least two stud bolts simultaneously.

11. The inflator according to claim 6, wherein the at least two stud bolts are welded to the two portions located along an axial direction of the cylindrical housing.

12. The inflator according to claim 10, wherein the at least two stud bolts are separated by an angle of no more than 90°.

13. The inflator according to claim 12, wherein the at least two stud bolts are separated by an angle of no more than 45°.

14. The inflator according to claim 1, wherein the inflator is used as one of a curtain air bag inflator and a side air bag inflator.

15. The inflator according to claim 1, further comprising:
   a bracket adapted to be attached to the first stud bolt.

16. The inflator according to claim 1, further comprising:
   a second stud bolt welded directly to a side surface of the first closure.

17. The inflator according to claim 16, wherein the first stud bolt and the second stud bolt are welded at positions located along the circumferential direction of the cylindrical housing substantially perpendicular to an axial direction of the cylindrical housing, and a bracket is adapted to be integrally attached to the first stud bolt and the second stud bolt simultaneously.

18. The inflator according to claim 6, wherein, at least one of a protruding portion and a recessed portion is provided on at least one of the at least two stud bolts and said two portions where the at least two stub bolts abuts the two portions when welding.

19. The inflator according to claim 18, wherein the protruding portion is a concave portion formed at each of the at least two stud bolts and the recessed portion is a convex portion formed in each of the two portions.

20. The inflator according to claim 18, wherein the protruding portion is a concave portion formed in each of the two portions and the recessed portion is a convex portion formed at each end of the at least two stud bolts.

21. The inflator according to claim 17, wherein the first stud bolt and the second bolt extend in the same direction and in parallel to one another.

22. The inflator according to claim 6, wherein the inflator is used as one of a curtain air bag inflator and a side air bag inflator.

* * * * *